O. SILBERRAD.
MANUFACTURE OF ISOPRENE.
APPLICATION FILED JAN. 24, 1911.
1,022,338.
Patented Apr. 2, 1912.
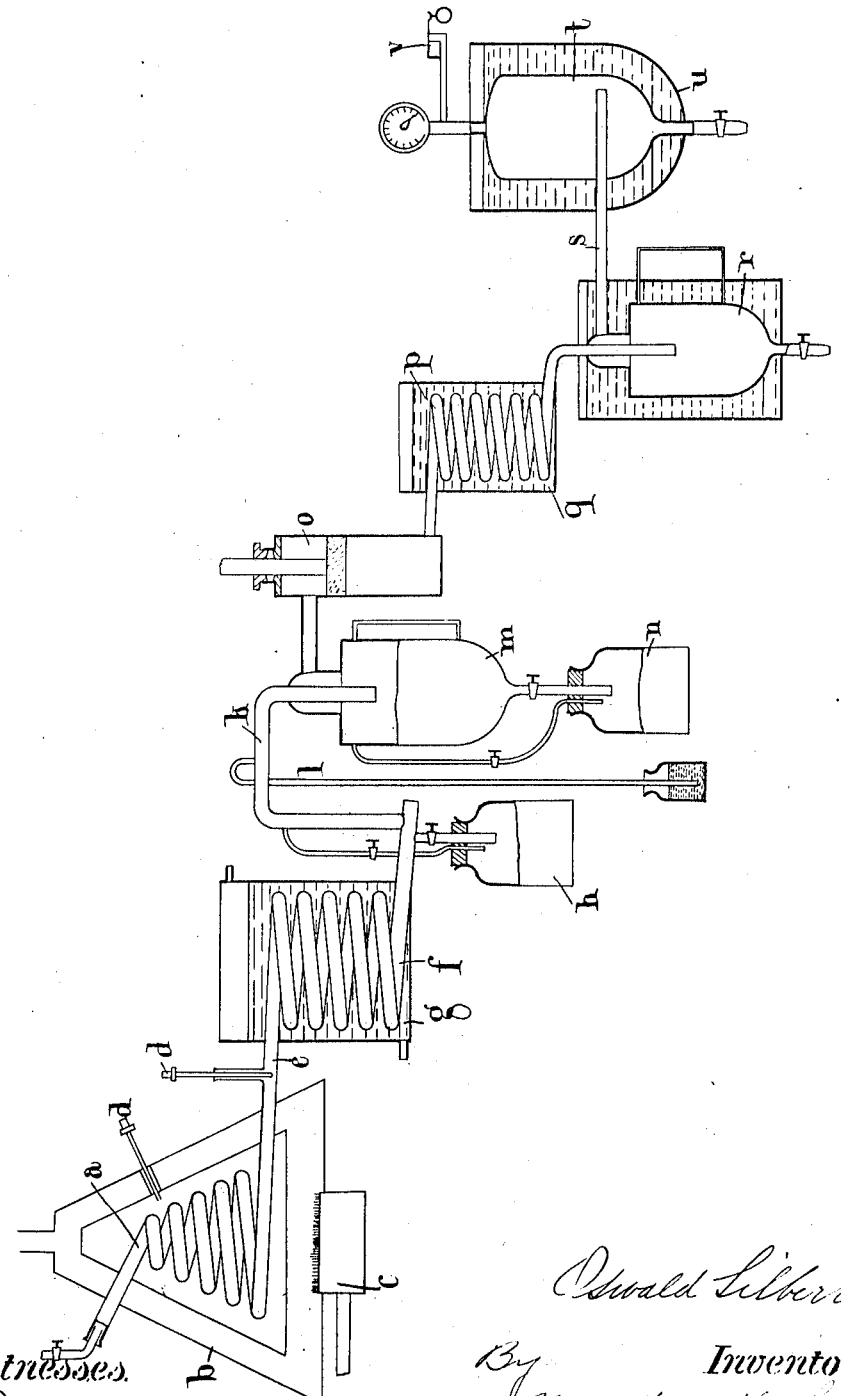
Witnesses.
Oswald Silberrad
Inventor.
By
Attorneys.

UNITED STATES PATENT OFFICE.

OSWALD SILBERRAD, OF BUCKHURST HILL, ENGLAND.

MANUFACTURE OF ISOPRENE.

1,022,338.  Specification of Letters Patent.  Patented Apr. 2, 1912.

Application filed January 24, 1911. Serial No. 604,473.

*To all whom it may concern:*

Be it known that I, OSWALD SILBERRAD, a subject of the King of Great Britain and Ireland, residing at The Silberrad Research Laboratories, Buckhurst Hill, Essex, England, have invented certain new and useful Improvements in the Manufacture of Isoprene, of which the following is a specification.

The present invention relates to the depolymerization of turpentine oil for the production of isoprene.

It is well known that when hydrocarbons are subjected to sufficiently high temperature, as by passing through a hot tube, or dropping on to a hot surface, many of them undergo depolymerization. In most cases, however, the yield of any one product is so small, and the products obtained are so impure, that the process is of no commercial value as a source of any particular product.

The present invention consists in an improved method of procedure by which a larger yield can be obtained.

The invention consists more specifically in subjecting turpentine oil to the action of heat, for example, by passing turpentine vapor through a hot tube, under such conditions that the pressure in the apparatus in which depolymerization occurs is considerably below atmospheric pressure.

The invention also consists in the improved process for obtaining isoprene hereinafter described.

The accompanying drawing illustrates one form of apparatus suitable for carrying the invention into effect.

The apparatus consists of a heating coil $a$, inside a heating chamber $b$, heated by the products of combustion from a number of gas burners $c$, electric pyrometers $d$, $d$, being provided to determine the temperature. From the heating coil, a pipe $e$ leads to a water cooling coil $f$, situated in a water chamber $g$. The hydrocarbons condensed in the coil $f$ pass into a vessel $h$, and the uncondensed vapors pass through a pipe $k$ provided with a mercury gage $l$ into another condensing chamber $m$, from which further hydrocarbons are collected in the vessel $n$. The vacuum is produced by means of the vacuum and compressing pump $o$, and the vapors passing the pump pass through a cooling coil $p$ immersed in brine contained in the chamber $q$. Isoprene is condensed in the coil $p$ and is collected in the chamber $r$. From the chamber $r$, the uncondensed vapor passes by the pipe $s$ to the chamber $t$, immersed in brine contained in the vessel $u$. A blow-off valve $v$ is provided from the top of this last condensing chamber.

In carrying the invention into effect, the turpentine oil to be depolymerized is passed through the tube $a$ which is heated to about 450° C. to 750° C., at a pressure greatly below atmospheric pressure, the suction being produced by the pump $o$, from which the gases are delivered, and the demiterpene and the like condensed.

I find it desirable to pass the vapor over a considerable surface of metal preferably contained in a metallic tube, as by this means the gas passing through the tube is brought to an even temperature throughout.

In carrying out the invention according to another example, I may use the equivalent process of dropping the turpentine oil to be depolymerized into an evacuated retort heated to redness, the retort being connected at one end to a suction apparatus from which the gases may be delivered, and the demiterpene and the like condensed.

In the above description of my process I mean by the term "turpentine oil" turpentine oil irrespective of whatever its source may be, America, Russia or elsewhere.

I find that by either of the above described processes the yield of isoprene can be made to exceed 25 per cent.; indeed, with efficient apparatus I have succeeded in raising the yield to 50%.

The pressure utilized for the process may be anything below about 200 mm. of mercury, but I have found that the lower the pressure, the better is the result which is obtained.

The following examples may be given as illustrating the process:—

Example 1: 8 liters of turpentine were passed through the spiral heating tube, heated to 550° C., at a pressure of about 5 to 16 mm. of mercury. The vapor passes through the condensers to the vacuum pump, which delivers the vapor into the condensing apparatus beyond it, where the more volatile products of reaction are condensed under pressure. From 8 liters of turpentine the following products were obtained:—24 cc. liquid boiling between 5 and 16° C., 723 cc. crude isoprene, 537 cc. benzene, toluene, xylol, etc., 6686 cc. recovered turpentine. (No sesquiterpene or resin is obtained). Hence 1314 cc. turpentine was used and yielded 1.83% 24 cc. substance of B. P. 5 to 16° C., 55.02% 723 cc. crude isoprene (containing 61% pure isoprene), 40.86% 537 cc. benzol, toluol, xylol, etc., 2.29% loss and uncondensable gas.

Example 2: The heating tube was heated to 550° C. at a pressure of from 200 to 210 mm. of mercury. From 8 liters of turpentine treated in this way, the following products were obtained:—51 cc. liquid (B. P. .5 to 16° C.), 623 cc. crude isoprene, 829 cc. benzol, toluol, xylol, etc., 6115 cc. recovered turpentine, 173 cc. sesquiterpene, resin, etc., (B. P. over 200° C.) Hence 1885 turpentine was used, and yielded 51 cc.=2.7%= liquid B. P. .5 to 16° C., 623 cc.=33.0%= crude isoprene, 829 cc.=44.1%=benzol, toluol, etc., 173 cc.=9.2%=sesquiterpene and resin, (B. P. over 200° C.) Loss=10.8%= uncondensable gas.

I claim:—

1. A process for the production of isoprene by the depolymerization of turpentine consisting in heating the turpentine to a temperature of about 450 C. to 750 C. in apparatus which is maintained at a pressure considerably below atmospheric pressure, as set forth.

2. A process for the production of isoprene by the depolymerization of turpentine consisting in passing turpentine through a tube heated to a temperature of 450 to 750 C. the interior of which is maintained at a pressure considerably below atmospheric pressure.

In testimony whereof I have signed my name to this specification in the presence of two subscribing witnesses.

OSWALD SILBERRAD.

Witnesses:
 W. J. McADAMS,
 P. A. OUTHWAITE.